US012092448B2

(12) United States Patent
Mantri et al.

(10) Patent No.: US 12,092,448 B2
(45) Date of Patent: Sep. 17, 2024

(54) DEPTH ESTIMATION FOR AUGMENTED REALITY

(71) Applicant: Verizon Patent and Licensing Inc., Basking Ridge, NJ (US)

(72) Inventors: Viraj C. Mantri, Mumbai (IN); Natarajan Jayapal Balajee, Coimbatore (IN); Srividhya Parthasarathy, Chennai (IN); Stewart Katz, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 45 days.

(21) Appl. No.: 17/724,268

(22) Filed: Apr. 19, 2022

(65) Prior Publication Data
US 2023/0332883 A1 Oct. 19, 2023

(51) Int. Cl.
*G01B 11/22* (2006.01)
*G01B 11/00* (2006.01)
*G01B 11/02* (2006.01)
*G06F 3/01* (2006.01)

(52) U.S. Cl.
CPC ............ *G01B 11/22* (2013.01); *G01B 11/002* (2013.01); *G01B 11/026* (2013.01); *G06F 3/012* (2013.01); *G06F 3/013* (2013.01)

(58) Field of Classification Search
None
See application file for complete search history.

(56) References Cited

U.S. PATENT DOCUMENTS

| 11,143,865 B1* | 10/2021 | Bedard | G06F 3/013 |
| 11,158,126 B1* | 10/2021 | Petrov | G06F 3/012 |
| 2012/0113228 A1* | 5/2012 | Konno | H04N 13/356 |
| | | | 348/47 |
| 2015/0123966 A1* | 5/2015 | Newman | G06T 19/006 |
| | | | 345/419 |
| 2016/0162082 A1* | 6/2016 | Schwesinger | G06F 3/013 |
| | | | 345/173 |
| 2018/0114298 A1* | 4/2018 | Malaika | G02B 27/017 |
| 2020/0310537 A1* | 10/2020 | Simmons | G02B 27/0172 |
| 2020/0409161 A1* | 12/2020 | Cui | G02B 27/0172 |
| 2021/0055555 A1* | 2/2021 | Chi | G02B 6/0026 |
| 2021/0133929 A1* | 5/2021 | Ackerson | G06T 9/001 |
| 2021/0330185 A1* | 10/2021 | Krukowski | A61B 3/028 |
| 2022/0198768 A1* | 6/2022 | Tezaur | G06T 7/50 |

\* cited by examiner

*Primary Examiner* — Talha M Nawaz (57) ABSTRACT

An illustrative augmented reality (AR) management system determines a first optic parameter of a user corresponding to a first viewed point in a real-world environment and a second optic parameter of the user corresponding to a second viewed point in the real-world environment. The first viewed point and the second viewed point are viewed by the user as the user visually focuses on a target point in the real-world environment. The AR management system determines a depth value of the target point based on the first optic parameter and the second optic parameter, and creates an AR anchor associated with the target point based at least on the depth value. Corresponding methods and systems are also disclosed.

19 Claims, 6 Drawing Sheets

DEPTH ESTIMATION FOR AUGMENTED REALITY

BACKGROUND INFORMATION

An augmented reality (AR) device may provide a user with an AR experience in which a digital component is overlaid on a live camera stream of a physical environment around the user and the user may perceive the digital component as part of the physical environment. As the user may look at different positions in the physical environment, the AR device may monitor the positions being seen by the user and provide corresponding AR experiences to the user accordingly.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Methods and systems to perform depth estimation for augmented reality (AR) are described herein. In some embodiments, as a user uses an AR device, the user may visually focus on a target point in a real-world environment and the methods and systems may determine a depth value of the target point. The depth value of the target point may indicate a distance between the target point and an eye of the user in a head direction of the user. As described herein, the depth value of the target point may be included in three dimensional (3D) coordinates of the target point as a z-coordinate of the target point. The 3D coordinates of the target point may be subjected to processing operations such as coordinate translation and may be used in managing AR scenes presented to the user by the AR device.

The methods and systems described herein are capable of determining the depth value of the target point based on eye operations of the user. Due to dynamic adjustments of the irises and/or the pupils in the eyes of the user, when the user visually focuses on the target point in the real-world environment, the user may actually view a first viewed point and a second viewed point in the real-world environment that are within a proximity of the target point. As described herein, the methods and systems may monitor an optic parameter (e.g., left pupil coordinates and right pupil coordinates) of the user as the user looks around in the real-world environment. Based on the monitoring of the optic parameter, the methods and systems may determine a first optic parameter (e.g., left pupil coordinates and right pupil coordinates) of the user with which the first viewed point is viewed and a second optic parameter (e.g., left pupil coordinates and right pupil coordinates) of the user with which the second viewed point is viewed. The methods and systems may determine the depth value of the target point based on the first optic parameter associated with the first viewed point and the second optic parameter associated with the second viewed point.

In some embodiments, the methods and systems may create an AR anchor associated with the target point based at least on the depth value of the target point. For example, the depth value of the target point may be included in three dimensional (3D) coordinates of the target point in a 3D real-world coordinate system as a z-coordinate of the target point. As described herein, the methods and systems may translate the 3D coordinates of the target point in the 3D real-world coordinate system into 3D coordinates of the target point in 3D AR coordinate system. The methods and systems may create an AR anchor at the 3D coordinates of the target point in the 3D AR coordinate system, and store a particular AR scene in association with the AR anchor in an AR data storage. When the user views or visually focuses on an additional target point that matches the AR anchor at a later time, the methods and systems may retrieve the particular AR scene associated with the AR anchor from the AR data storage, and present the particular AR scene to the user at the additional target point matching the AR anchor.

The methods and systems described herein may be advantageous in a number of technical respects. For example, as described herein, the methods and systems may determine the depth value of the target point based on the eye operations of the user without using a depth sensor. Therefore, the methods and systems may be implemented to provide depth estimation capability for low-end or legacy AR devices that do not include a depth sensor. The methods and systems may also eliminate the need to include a depth sensor (e.g., a LiDAR depth sensor) in an AR device to perform depth estimation, and thus a device cost of the AR device may be reduced.

In addition, the methods and systems may use the 3D coordinates of the target point including the depth value of the target point in creating an AR anchor associated with the target point. As described herein, the methods and systems may store a particular AR scene in association with the AR anchor and present the particular AR scene to the user when the user views or visually focuses on the additional target point matching the AR anchor at a later time. Accordingly, the methods and systems may trigger the display of the particular AR scene to the user at the additional target point that matches the AR anchor even if the user views or visually focuses on the additional target point from a distance longer than a detection range threshold of the AR device (e.g., 2 m). Thus, the methods and systems may facilitate the user in using the AR device to view AR scenes, and therefore user experience of the user with the AR device may be improved.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein may provide any of the benefits mentioned above, as well as various additional and/or alternative benefits that will be described and/or made apparent below.

Figure 1:
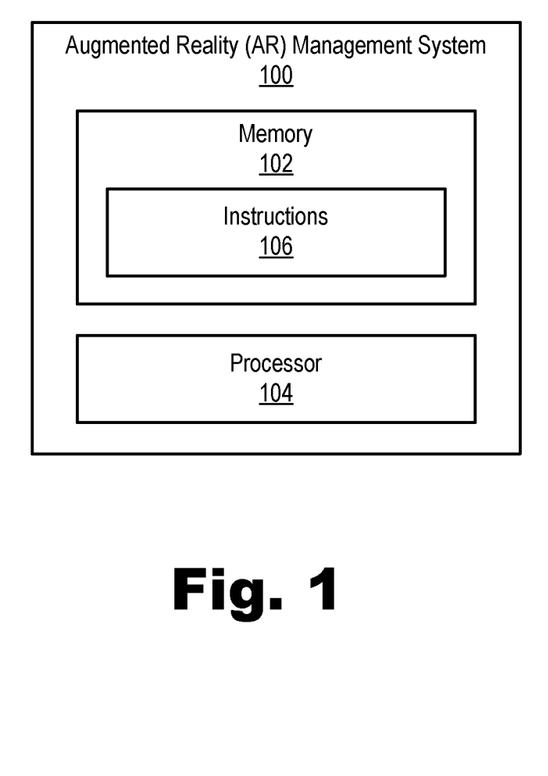
FIG. 1 shows an illustrative augmented reality (AR) management system according to embodiments described herein.

FIG. 1 shows an illustrative AR management system 100 (system 100) for depth estimation and AR scene management. As described herein, system 100 may be configured to determine a depth value of a target point on which a user visually focuses and manage AR scenes based at least on the depth value of the target point. In some embodiments, system 100 may be implemented by computer resources such as processors, memory devices, storage devices, communication interfaces, and so forth. In some embodiments, system 100 may be implemented in an AR device (e.g., mobile phone, smart glasses, etc.) of the user with which the user experiences AR scenes. Additionally or alternatively, system 100 may be implemented in a computing device (e.g., a cloud server) communicatively coupled to the AR device and configured to perform one or more computing operations for the AR device.

As depicted in FIG. 1, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 104 (e.g., when processor 104 is directed to perform operations represented by instructions 106 stored in memory 102), system 100 may perform various functions associated with depth estimation and AR scene management in any manner described herein or as may serve a particular implementation.

Figure 2A:
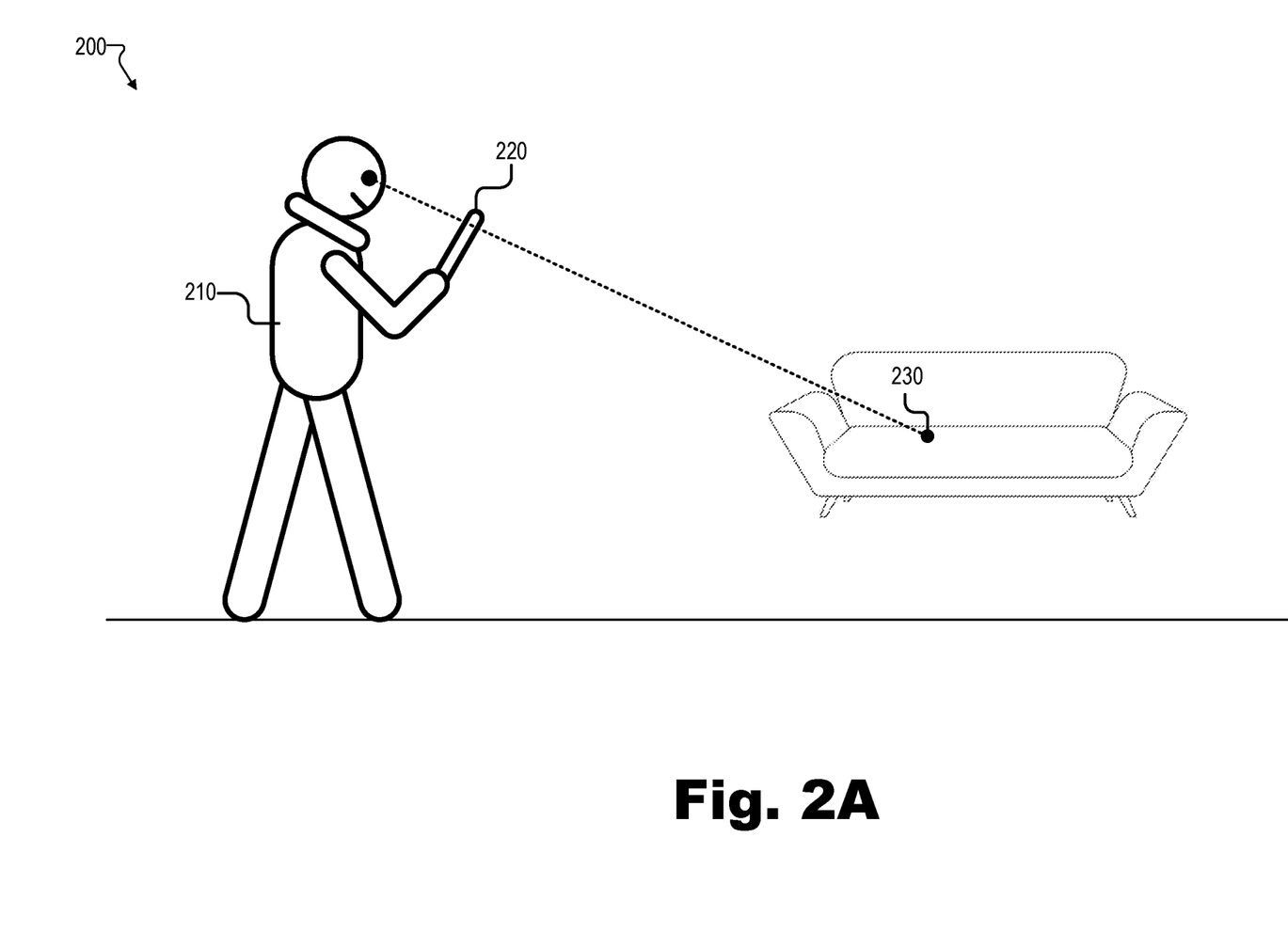
FIGS. 2A and 2B show illustrative scenarios in which a user uses an AR device according to embodiments described herein.
Figure 2B:
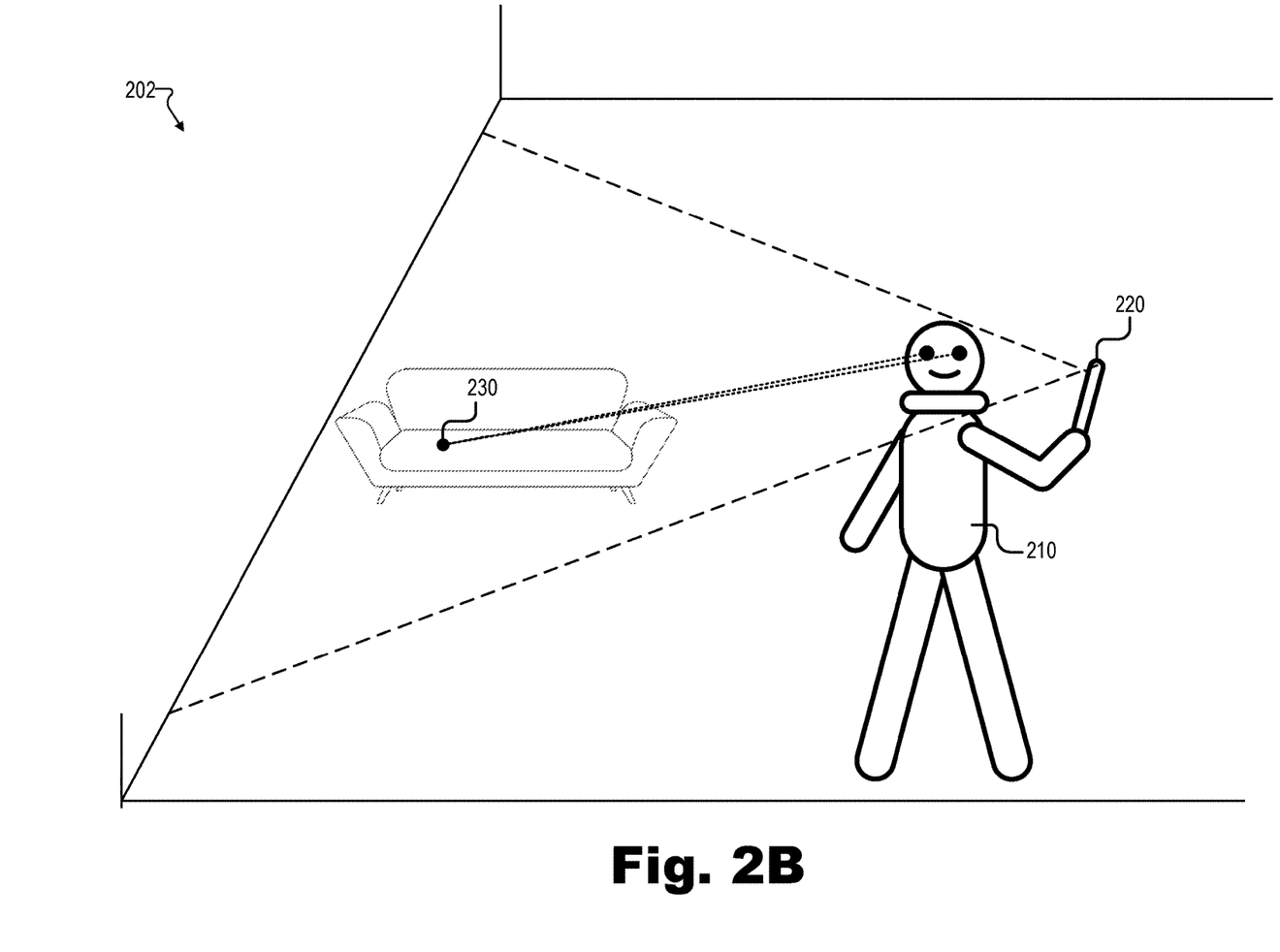

FIGS. 2A and 2B illustrate example scenarios in which a user uses an AR device. As depict in scenarios 200 and 202 in FIGS. 2A and 2B, a user 210 may use an AR device 220 to experience AR scenes generated by AR device 220. In some embodiments, AR device 220 may be an electronic device (e.g., mobile phone, smart glasses, head-mounted holographic device, etc.) including an AR application and user 210 may operate the AR application on AR device 220 to experience AR scenes. AR device 220 may also include one or more cameras (e.g., a front camera and/or a rear camera) configured to capture one or more camera frames (e.g., image frames and/or video frames) of user 210 and a real-world environment around user 210.

In some embodiments, when using AR device 220 to experience AR scenes, user 210 may visually focus on a target point in the real-world environment. The target point may be a point of interest that user 210 visually aims at. In some embodiments, the target point may be associated with an object in the real-world environment. For example, the target point may be located on an object (e.g., a laptop) and may be associated with the object. In some embodiments, the target point may be associated with a particular context in the real-world environment. For example, the target point may be located within an area including various objects that are placed in a specific arrangement and the target point may be associated with the specific arrangement of the objects. In some embodiments, the target point may be considered an individual point in the real-world environment that is not associated with any object and/or any particular context.

In some embodiments, as user 210 visually focuses on or aims at the target point, the eyes of user 210 may actually see a viewed point located proximate to the target point due to dynamic optic adjustments such as contraction and/or dilation of the irises and/or the pupils in the eyes of user 210. The viewed point may match the target point or may be located within a limited distance from the target point. For example, a distance between the viewed point and the target point may be shorter than a predefined distance threshold (e.g., a few millimeters). The viewed point that user 210 actually views while visually focusing on or aiming at the target point may be referred to as the viewed point associated with the target point.

In some embodiments, when user 210 visually focuses on the target point while using AR device 220, AR device 220 may be positioned such that one or more cameras of AR device 220 may capture the viewed point actually viewed by user 210 and also capture at least the head and the eyes of user 210 in one or more camera frames. As an example, in scenario 200 depicted in FIG. 2A, user 210 may hold AR device 220 between user 210 and the target point, and thus user 210 may view a viewed point 230 associated with the target point through a rear camera of AR device 220. In this case, the rear camera of AR device 220 may capture one or more camera frames of the viewed point 230 and a front camera of AR device 220 may capture one or more camera frames of the head and the eyes of user 210 with which the viewed point 230 is viewed. As another example, in scenario 202 depicted in FIG. 2B, user 210 may hold AR device 220 in front of both user 210 and the target point, and thus user 210 may view the viewed point 230 associated with the target point in a direct manner with the eyes of user 210 and not through a camera of AR device 220. In this case, the front camera of AR device 220 may capture the viewed point 230 and also capture the head and the eyes of user 210 with which the viewed point 230 is viewed. In some embodiments, the viewed point 230, the head of user 210, and/or one or more eyes of user 210 may be captured in the same camera frame or in different camera frames.

In some embodiments, as user 210 views different viewed points in the real-world environment, the camera frames that capture the viewed points and/or capture the head and the eyes of user 210 with which the viewed points are viewed may be used to determine optic parameters (e.g., left pupil coordinates and right pupil coordinates) of user 210 with which user 210 views the viewed points. Thus, the optic parameter of user 210 may be monitored as user 210 views different viewed points in the real-world environment. In some embodiments, user 210 may actually view one or more viewed points while visually focusing on a target point as described herein, and the optic parameters of user 210 with which user 210 views these viewed points may be used to determine a depth value of the target point. The optic parameter with which user 210 views a particular viewed point may be referred to as the optic parameter (e.g., the left pupil coordinates and the right pupil coordinates) of user 210 corresponding to the particular viewed point.

Figure 3:
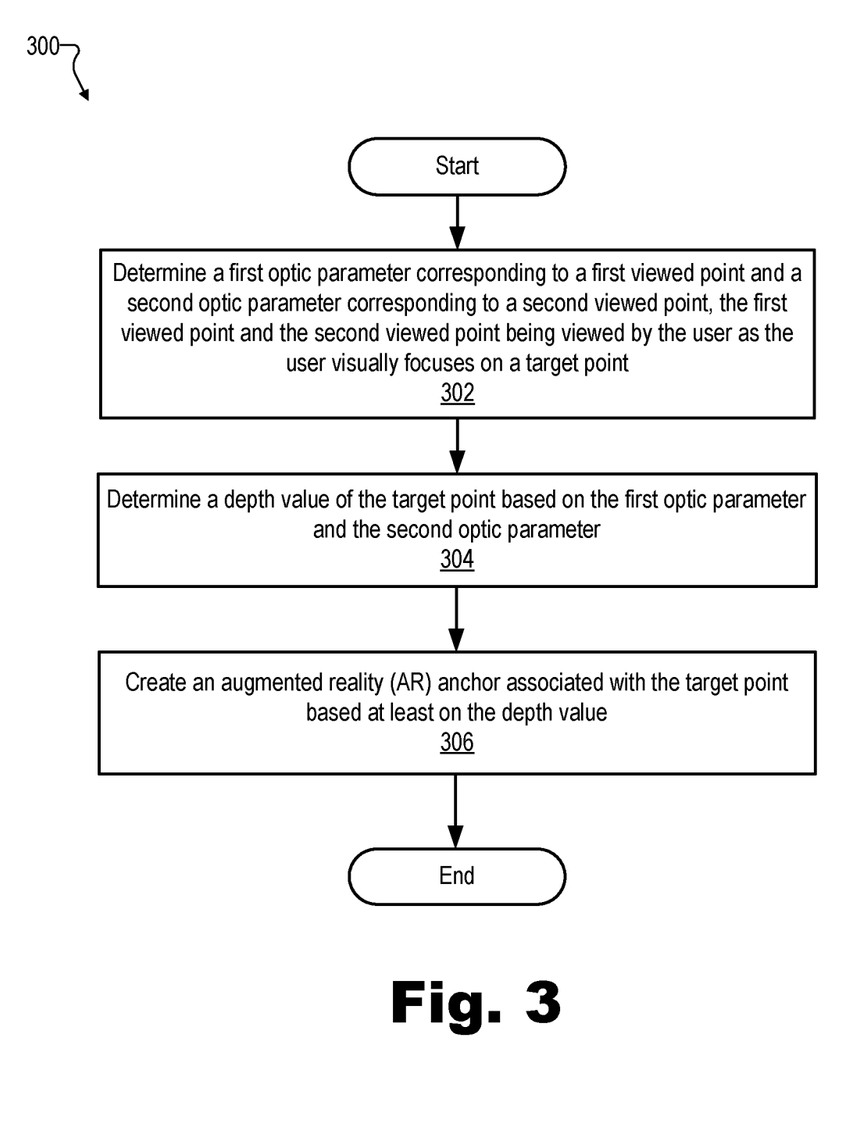
FIG. 3 shows an illustrative method for an AR management system according to embodiments described herein.

FIG. 3 shows an illustrative method 300 for depth estimation and AR scene management in accordance with principles described herein. While FIG. 3 illustrates example operations according to one embodiment, other embodiments may omit, add to, reorder, combine, and/or modify any of the operations shown in FIG. 3. One or more of the operations shown in FIG. 3 may be performed by an AR management system such as system 100 and/or by any implementation thereof.

At operation 302, for a target point that user 210 visually focuses on in a real-world environment, system 100 may determine a first optic parameter of user 210 corresponding to a first viewed point in the real-world environment and a second optic parameter of user 210 corresponding to a second viewed point in the real-world environment. The first viewed point and the second viewed point may be viewed by user 210 as user 210 visually focuses on the target point due to dynamic optic adjustments such as contraction and/or dilation of the irises and/or the pupils in the eyes of the user. As described herein, the first viewed point and the second viewed point may be within a proximity of the target point. For example, the first viewed point and the second viewed point may match the target point or may be located within a limited distance (e.g., a few millimeters) from the target point.

In some embodiments, system 100 may determine the first optic parameter of user 210 corresponding to the first viewed point based on one or more camera frames that capture at least the eyes of user 210 as user 210 views the first viewed point. Similarly, system 100 may determine the second optic parameter of user 210 corresponding to the second viewed point based on one or more camera frames that capture at least the eyes of user 210 as user 210 views the second viewed point. In some embodiments, the first optic parameter of user 210 may include left pupil coordinates and right pupil coordinates of user 210 with which the first viewed point is viewed. The second optic parameter of user 210 may include left pupil coordinates and right pupil coordinates of user 210 with which the second viewed point is viewed. In some embodiments, the left pupil coordinates of user 210 may be the coordinates of a pupil in a left eye of user 210 (also referred to as the left pupil of user 210) and the right pupil coordinates of user 210 may be the coordinates of a pupil in a right eye of user 210 (also referred to as the right pupil of user 210). As the left pupil coordinates and the right pupil coordinates of user 210 may be determined based on the camera frames captured by the cameras of AR device 220 and these camera frames may be presented on a display screen of AR device 220, the left pupil coordinates and the right pupil coordinates of user 210 may be two dimensional (2D) coordinates in a 2D screen coordinate system associated with the display screen of AR device 220.

At operation 304, system 100 may determine a depth value of the target point based on the first optic parameter (e.g., the left pupil coordinates and the right pupil coordinates) of user 210 corresponding to the first viewed point and the second optic parameter (e.g., the left pupil coordinates and the right pupil coordinates) of user 210 corresponding to the second viewed point. As described herein, user 210 may actually view the first viewed point and the second viewed point while visually focusing on the target point. In some embodiments, to determine the depth value of the target point, system 100 may use the left pupil coordinates and the right pupil coordinates of user 210 corresponding to the first viewed point to compute distances between the left pupil and the right pupil of user 210 with which the first viewed point is viewed in terms of x-coordinate and y-coordinate in the 2D screen coordinate system. Similarly, system 100 may use the left pupil coordinates and the right pupil coordinates of user 210 corresponding to the second viewed point to compute distances between the left pupil and the right pupil of user 210 with which the second viewed point is viewed in terms of x-coordinate and y-coordinate in the 2D screen coordinate system. The distances between the left pupil and the right pupil of user 210 with which the first viewed point is viewed in terms of x-coordinate and y-coordinate in the 2D screen coordinate system and the distances between the left pupil and the right pupil of user 210 with which the second viewed point is viewed in terms of x-coordinate and y-coordinate in the 2D screen coordinate system may be used to compute the depth value of the target point.

At operation 306, system 100 may create an AR anchor associated with the target point based at least on the depth value of the target point. In some embodiments, the AR anchor may be a marker indicating a particular position in the real-world environment such as the target point and the AR anchor may be used to present an AR scene such as an AR scene associated with the target point to user 210. In some embodiments, an AR scene may include a camera frame that captures the real-world environment from a perspective of user 210 in real-time and also include one or more virtual elements (e.g., graphical element, textual element, video element, etc.) that are electronically generated and superimposed on the camera frame at the AR anchor. The one or more virtual elements may be positioned relative to the camera frame at the AR anchor such that user 210 may perceive the one or more virtual elements as part of the real-world environment depicted in the camera frame.

In some embodiments, to create the AR anchor associated with the target point, system 100 may include the depth value of the target point as a z-coordinate in a 3D coordinates of the target point in a 3D real-world coordinate system associated with an eye of user 210. System 100 may also compute an x-coordinate and a y-coordinate in the 3D coordinates of the target point in the 3D real-world coordinate system based on the first optic parameter (e.g., the left pupil coordinates and the right pupil coordinates) of user 210 corresponding to the first viewed point or based on the second optic parameter (e.g., the left pupil coordinates and the right pupil coordinates) of user 210 corresponding to the second viewed point using midpoint calculation. In some embodiments, system 100 may perform a coordinate translation to translate the 3D coordinates of the target point in the 3D real-world coordinate system associated with the eye of user 210 to 3D coordinates of the target point in a 3D AR coordinate system associated with a camera of AR device 220. System 100 may then create the AR anchor associated with the target point at the 3D coordinates of the target point in the 3D AR coordinate system.

In some embodiments, the AR anchor may be used to manage an AR scene associated with the target point. For example, system 100 may store data describing the AR scene associated with the target point in an AR data storage. The data may include a feature map describing the real-world environment, one or more virtual elements associated with the target point that are included in the AR scene, and the AR anchor at which the one or more virtual elements may be rendered. In some embodiments, when user 210 views or visually focuses on an additional target point that matches the AR anchor at a later time, system 100 may re-instantiate the AR scene based on the data and present the AR scene to user 210 at the additional target point that matches the AR anchor. As the AR anchor may be created at the 3D coordinates of the target point in the 3D AR coordinate system and the AR scene associated with the target point may be stored with the AR anchor in the AR data storage as described herein, the AR scene associated with the target point may be referred to as the AR scene associated with the AR anchor and vice versa.

In some embodiments, system 100 may perform method 300 described above to determine a depth value of a target point and create an AR anchor associated with the target point in response to receiving a user input from user 210. For example, when using AR device 220 to experience AR scenes, user 210 may visually focus on the target point in the real-world environment and provide a user input requesting that an AR anchor associated with the target point is created. The user input may be provided via a user interface (e.g., a touchscreen, a keyboard, a voice command interface, etc.) of AR device 220. Additionally or alternatively, the user input may include an optic action performed by user 210. For example, user 210 may blink one or two eyes, close one or two eyes for a predetermined time period (e.g., 5s), and/or perform other types of optic action to request an AR anchor be created for the target point.

In some embodiments, in response to receiving the user input from user 210, system 100 may determine the depth value of the target point on which user 210 currently focuses and create the AR anchor associated with the target point based at least on the depth value. Alternatively, system 100 may determine the depth value for each target point on which user 210 visually focuses as user 210 uses AR device 220 and looks around the real-world environment in an AR session. Thus, the depth value of various target points associated with user 210 in the AR session may be monitored. In this case, when receiving the user input to create an AR anchor, system 100 may retrieve the depth value computed for the target point on which user 210 currently focuses, and create the AR anchor associated with the target point based at least on the depth value of the target point.

As described herein, to determine the depth value of the target point, system 100 may use the optic parameters (e.g., the left pupil coordinates and the right pupil coordinates) of user 210 corresponding to one or more viewed points that are viewed by user 210 when user 210 visually focuses on the target point. When user 210 visually focuses on or aims at the target point, the eyes of user 210 may actually see the one or more viewed points located proximate to the target point due to dynamic optic adjustments such as contraction and/or dilation of the irises and/or the pupils in the eyes of user 210 as described herein. In some embodiments, system 100 may monitor the optic parameter (e.g., the left pupil coordinates and the right pupil coordinates) of user 210 as user 210 views different viewed points in the real-world environment during the AR session. To monitor the optic parameter of user 210, the cameras of AR device 220 may capture user 210 and also capture various viewed points being viewed by user 210 during the AR session. For each viewed point being viewed by user 210, system 100 may receive one or more camera frames associated with the viewed point from one or more cameras of AR device 220. The camera frames associated with the viewed point may capture the viewed point and/or capture the head and the eyes with which user 210 views the viewed point as described herein. In some embodiments, system 100 may determine the optic parameter (e.g., the left pupil coordinates and the right pupil coordinates) of user 210 with which the viewed point is viewed based on the camera frames associated with the viewed point.

Figure 4:
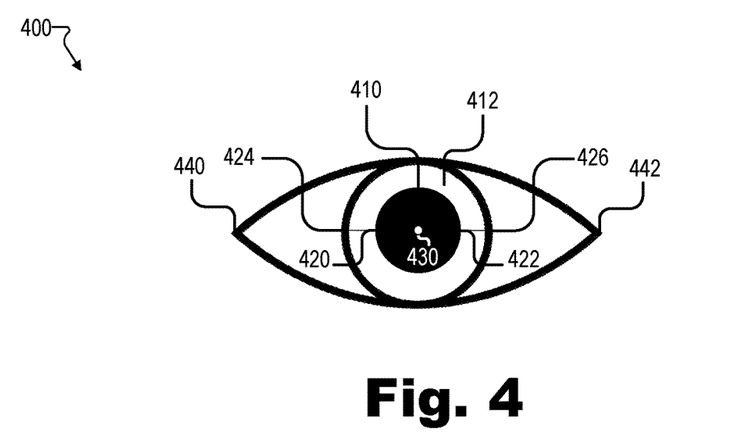
FIG. 4 shows an illustrative diagram of an eye of a user according to embodiments described herein.

In some embodiments, to determine the optic parameter of user 210 with which the viewed point is viewed, system 100 may determine one or more optic landmarks of the eyes of user 210 in the camera frames associated with the viewed point. The optic landmarks may include one or more predefined points of the left eye and the right eye of user 210 when user 210 views the viewed point and may be referred to as the optic landmarks of user 210 corresponding to the viewed point. Examples of the optic landmarks are illustrated in FIG. 4. As depicted in a diagram 400 in FIG. 4, an eye (e.g., the left eye or the right eye) of user 210 may include a pupil 410 and an iris 412. In some embodiments, the optic landmarks of the eye may include a first end 420 and a second end 422 indicating a diameter of pupil 410, a first end 424 and a second end 426 indicating a diameter of iris 412, and/or a center point 430 of pupil 410 and iris 412. The optic landmarks may also include a first eye corner 440 located at a first end of the eye and a second eye corner 442 located at a second end of the eye. Other optic landmarks of the eye are also possible and contemplated.

In some embodiments, to determine the optic landmarks of the eyes of user 210 in the camera frames associated with the viewed point, system 100 may input the camera frames associated with the viewed point into a machine learning model (e.g., a neural network model, a logistic regression model, and/or other types of machine learning models). The machine learning model may be trained to detect the optic landmarks of the eyes (e.g., the left eye and the right eye) of user 210 in the camera frames and also determine coordinates of the optic landmarks. Because the coordinates of the optic landmarks of the eyes of user 210 may be determined from the camera frames that are captured by the cameras of AR device 220 and presented on the display screen of AR device 220, the coordinates of the optic landmarks (e.g., the first eye corner 440 and the second eye corner 442 of the left eye and the right eye of user 210) may be 2D coordinates in the 2D screen coordinate system associated with the display screen of AR device 220 as described herein. In some embodiments, instead of using the machine learning model, system 100 may perform image processing operations on the camera frames associated with the viewed point to detect the optic landmarks of user 210 and determine the coordinates of the optic landmarks. Other implementations to determine the optic landmarks of user 210 corresponding to the viewed point are also possible and contemplated.

In some embodiments, system 100 may determine the optic parameter (e.g., the left pupil coordinates and the right pupil coordinates) of user 210 corresponding to the viewed point based on the optic landmarks of user 210 corresponding to the viewed point. In particular, system 100 may perform a midpoint calculation to compute the left pupil coordinates of user 210 corresponding to the viewed point based on the coordinates of the first eye corner 440 and the coordinates of the second eye corner 442 that are determined for the left eye of user 210 from the camera frames associated with the viewed point as described above. For example, system 100 may compute coordinates of a midpoint between the first eye corner 440 and the second eye corner 442 of the left eye of user 210 using the coordinates of the first eye corner 440 and the coordinates of the second eye corner 442, and determine the left pupil coordinates of user 210 corresponding to the viewed point to be the coordinates of the midpoint. The coordinates of the first eye corner 440 and the coordinates of the second eye corner 442 that are used in the midpoint calculation for the left eye may be 2D coordinates in the 2D screen coordinate system as described herein. Accordingly, the left pupil coordinates of user 210 corresponding to the viewed point may also be 2D coordinates in the 2D screen coordinate system.

Similarly, system 100 may perform a midpoint calculation to compute the right pupil coordinates of user 210 corresponding to the viewed point based on the coordinates of the first eye corner 440 and the coordinates of the second eye corner 442 that are determined for the right eye of user 210 from the camera frames associated with the viewed point as described above. For example, system 100 may compute coordinates of a midpoint between the first eye corner 440 and the second eye corner 442 of the right eye of user 210 based on the coordinates of the first eye corner 440 and the coordinates of the second eye corner 442, and determine the right pupil coordinates of user 210 corresponding to the viewed point to be the coordinates of the midpoint. The coordinates of the first eye corner 440 and the coordinates of the second eye corner 442 that are used in the midpoint calculation for the right eye may be 2D coordinates in the 2D screen coordinate system as described herein. Accordingly, the right pupil coordinates of user 210 corresponding to the viewed point may also be 2D coordinates in the 2D screen coordinate system.

In some embodiments, for each viewed point being viewed by user 210 during the AR session, system 100 may perform the operations described above to determine the optic parameter of user 210 corresponding to the viewed point. Thus, the optic parameter including the left pupil coordinates and the right pupil coordinates of user 210 may be monitored as user 210 views different viewed points during the AR session. In some embodiments, when user 210 visually focuses on a target point in the real-world environment and provide the user input to create an AR anchor associated with the target point, system 100 may identify a first optic parameter and a second optic parameter of user 210 corresponding to a first viewed point and a second viewed point that are viewed by user 210 as user 210 visually focuses on the target point. For example, system 100 may identify two optic parameters of user 210 that are determined for the two viewed points being viewed most recently when the user input is provided. System 100 may then use the two viewed points as the first viewed point and the second viewed point, and use the two optic parameters of user 210 corresponding to the two viewed points as the first optic parameter corresponding to the first viewed point and the second optic parameter of user 210 corresponding to the second viewed point in determining the depth value of the target point. In some embodiments, as user 210 visually focuses on the target point, user 210 may view the first viewed point and subsequently view the second viewed point.

As described herein, to determine the depth value of the target point, system 100 may use the first optic parameter including the left pupil coordinates and the right pupil coordinates of user 210 corresponding to the first viewed point to compute distances between the left pupil and the right pupil of user 210 with which the first viewed point is viewed in terms of x-coordinate and y-coordinate in the 2D screen coordinate system. Similarly, system 100 may use the second optic parameter including the left pupil coordinates and the right pupil coordinates of user 210 corresponding to the second viewed point to compute distances between the left pupil and the right pupil of user 210 with which the second viewed point is viewed in terms of x-coordinate and y-coordinate in the 2D screen coordinate system. The distances between the left pupil and the right pupil of user 210 with which the first viewed point is viewed in terms of x-coordinate and y-coordinate in the 2D screen coordinate system and the distances between the left pupil and the right pupil of user 210 with which the second viewed point is viewed in terms of x-coordinate and y-coordinate in the 2D screen coordinate system may be used to compute the depth value of the target point.

As an example, the first optic parameter of user 210 corresponding to the first viewed point may include left pupil coordinates $(x_1, y_1)$ and right pupil coordinates $(x_2, y_2)$ of user 210 with which the first viewed point is viewed. The second optic parameter of user 210 corresponding to the second viewed point may include left pupil coordinates $(a_1, b_1)$ and right pupil coordinates $(a_2, b_2)$ of user 210 with which the second viewed point is viewed. In some embodiments, system 100 may determine the depth value of the target point based on the left pupil coordinates $(x_1, y_1)$ and the right pupil coordinates $(x_2, y_2)$ of user 210 corresponding to the first viewed point and based on the left pupil coordinates $(a_1, b_1)$ and the right pupil coordinates $(a_2, b_2)$ of user 210 corresponding to the second viewed point using the following equation:

$$\text{Depth value} = \sqrt{((x_2-x_1)+(y_2-y_1))^2 + ((a_2-a_1)+(b_2-b_1))^2}$$

In some embodiments, the depth value of the target point may correspond to a distance between the target point and an eye (e.g., the left eye or the right eye) of user 210. The depth value of the target point may indicate the distance between the target point and the eye of user 210 in a head direction of user 210. In some embodiments, system 100 may include the depth value of the target point as a z-coordinate in 3D coordinates of the target point in a 3D real-world coordinate system associated with the eye of user 210. The 3D real-world coordinate system may have an origin positioned at the eye of user 210.

In some embodiments, system 100 may also compute an x-coordinate and a y-coordinate in the 3D coordinates of the target point in the 3D real-world coordinate system based on the first optic parameter of user 210 corresponding to the first viewed point or based on the second optic parameter of user 210 corresponding to the second viewed point. For example, system 100 may perform a midpoint calculation to compute the x-coordinate and the y-coordinate in the 3D coordinates of the target point in the 3D real-world coordinate system based on the first optic parameter of user 210 corresponding to the first viewed point. As described herein, the first optic parameter may include the left pupil coordinates and the right pupil coordinates of user 210 with which the first viewed point is viewed, and the left pupil coordinates and the right pupil coordinates of user 210 may be 2D coordinates in the 2D screen coordinate system. In some embodiments, system 100 may compute coordinates of a midpoint between the left pupil and the right pupil of user 210 when user 210 views the first viewed point using the left pupil coordinates and the right pupil coordinates of user 210. System 100 may then determine the x-coordinate and the y-coordinate in the 3D coordinates of the target point in the 3D real-world coordinate system to be an x-coordinate and a y-coordinate of the midpoint in the 2D screen coordinate system, respectively.

In some embodiments, in addition to the 3D coordinates of the target point in the 3D real-world coordinate system, system 100 may also determine a head direction of user 210 with which user 210 visually focuses on the target point. The head direction of user 210 with which user 210 visually focuses on the target point may be referred to as the head direction of user 210 corresponding to the target point. In some embodiments, system 100 may determine the head direction of user 210 corresponding to the target point based on one or more of a first head angle of user 210 with which the first viewed point is viewed, a second head angle of user 210 with which the second viewed point is viewed, or a difference in z-coordinate between the first viewed point and the second viewed point. The head angle of user 210 with which a viewed point (e.g., the first viewed point or the second viewed point) is viewed may be referred to as the head angle of user 210 corresponding to the viewed point.

Figure 5:
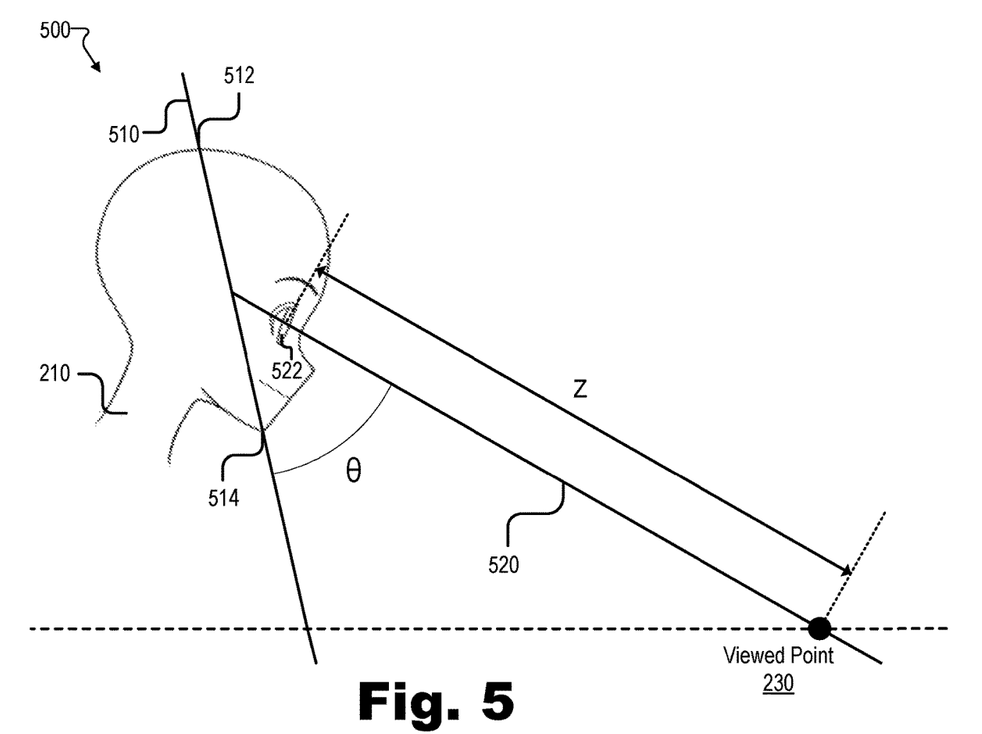
FIG. 5 shows an illustrative diagram of a user viewing a viewed point according to embodiments described herein.

In some embodiments, to determine a head angle of user 210 corresponding to a viewed point (e.g., the first viewed point or the second viewed point) of user 210, system 100 may use one or more camera frames associated with the viewed point. For example, system 100 may analyze the one or more camera frames that capture the viewed point and/or the head of user 210 when user 210 views the viewed point and determine two lines that form the head angle of user 210. As an example, FIG. 5 illustrates a diagram 500 in which user 210 views viewed point 230. As shown in FIG. 5, system 100 may determine a line 510 that includes a top point 512 and a bottom point 514 of the head of user 210 as two points of line 510, and determine a line 520 that includes viewed point 230 and an eye 522 of user 210 as two points of line 520. System 100 may determine a head angle of user 210 corresponding to viewed point 230 to be angle θ between line 510 and line 520 as depicted in FIG. 5. In some embodiments, system 100 may determine the first head angle θ1 of user 210 corresponding to the first viewed point and determine the second head angle θ2 of user 210 corresponding to the second viewed point in this manner. System 100 may also compute an angle difference ($\Delta_\theta$) between the first head angle $\theta_1$ of user 210 corresponding to the first viewed point and the second head angle $\theta_2$ of user 210 corresponding to the second viewed point.

In some embodiments, to determine the head direction of user 210 corresponding to the target point, system 100 may also determine a first distance $z_1$ between the first viewed point and the eye of user 210 and a second distance $z_2$ between the second viewed point and the eye of user 210. A distance z between a viewed point (e.g., the first viewed point or the second viewed point) of user 210 and the eye of user 210 may indicate a z-coordinate of the viewed point in the 3D real-world coordinate system. The 3D real-world coordinate system may have the origin positioned at the eye of user 210 and may have a z-axis matching a line that includes the viewed point and the eye of user 210 as two points of the line. In some embodiments, system 100 may perform one or more image processing operations on one or more camera frames that capture the viewed point and/or the eye of user 210 when user 210 views the viewed point to estimate the distance z between the viewed point and the eye of user 210. In some embodiments, system 100 may determine the first distance $z_1$ between the first viewed point and the eye of user 210 and determine the second distance $z_2$ between the second point and the eye of user 210 in this manner. System 100 may also compute a difference in z-coordinate ($\Delta_z$) between the first distance $z_1$ and the second distance $z_2$.

In some embodiments, system 100 may determine the head direction of user 210 corresponding to the target point based on one or more of the first head angle $\theta_1$ of user 210 with which the first viewed point is viewed, the second head angle $\theta_2$ of user 210 with which the second viewed point is viewed, or the difference in z-coordinate $\Delta_z$ between the first viewed point and the second viewed point as described herein.

As an example, if system 100 determines that the difference in z-coordinate $\Delta_z$ between the first viewed point and the second viewed point >0 and that the second head angle $\theta_2$ of user 210 with which the second viewed point is viewed >250°, system 100 may determine that the head direction of user 210 is "towards left."

As another example, if system 100 determines that the difference in z-coordinate $\Delta_z$ between the first viewed point and the second viewed point >0 and that the second head angle $\theta_2$ of user 210 with which the second viewed point is viewed <250°, system 100 may determine that the head direction of user 210 is "towards right."

As another example, if system 100 determines that the difference in z-coordinate $\Delta_z$ between the first viewed point and the second viewed point <0, system 100 may determine that the head direction of user 210 is "downwards."

As another example, if system 100 determines that the difference in z-coordinate $\Delta_z$ between the first viewed point and the second viewed point satisfies a difference threshold (e.g., $\Delta_z$>10), system 100 may determine that the difference in z-coordinate $\Delta_z$ is significant, and therefore determine that the head direction of user 210 is "upwards."

In some embodiments, once the 3D coordinates of the target point in the 3D real-world coordinate system and the head direction of user 210 corresponding to the target point are determined, system 100 may perform a coordinate translation to translate the 3D coordinates of the target point in the 3D real-world coordinate system to 3D coordinates of the target point in a 3D AR coordinate system. The 3D AR coordinate system may be associated with AR device 220 and may have an origin positioned at a camera of AR device 220. In some embodiments, the coordinate translation may be performed using the 3D coordinates of the target point in the 3D real-world coordinate system and the head direction of user 210 corresponding to the target point. The coordinate translation may be considered a shifting of the 3D real-world coordinate system including the target point in which the shifting is in the head direction of user 210 and the origin is shifted from the origin of the 3D real-world coordinate system, which is at the eye of user 210 to the origin of the 3D AR coordinate system, which is at the camera of AR device 220.

In some embodiments, the 3D coordinates of the target point in the 3D AR coordinate system may be used to manage an AR scene associated with the target point. As described herein, system 100 may create an AR anchor associated with the target point at the 3D coordinates of the target point in the 3D AR coordinate system, and thus the AR anchor may indicate a location of the target point. In some embodiments, system 100 may manage the AR scene associated with the target point based on the AR anchor. For example, system 100 may store data describing the AR scene associated with the target point in the AR data storage. As described herein, the data may include a feature map describing the real-world environment. The feature map may include one or more feature points indicating object placements, colors, a lighting condition, and/or other aspects of a portion of the real-world environment that is proximate to the target point (e.g., the portion of the real-world environment may include space within a predefined distance from the target point). The data may also describe one or more virtual elements (e.g., graphical element, textual element, video element, etc.) that are included in the AR scene associated with the target point, and also include information (e.g., the coordinates) of the AR anchor at which the one or more virtual elements may be rendered.

In some embodiments, system 100 may trigger a presentation of the AR scene associated with the target point based on the AR anchor. For example, user 210 may visually focuses on an additional target point at a different time after the AR anchor associated with the target point is created and system 100 may determine 3D coordinates of the additional target point in the 3D AR coordinate system in a manner similar to the manner being used to determine the 3D coordinates of the target point in the 3D AR coordinate system described herein. In some embodiments, system 100 may determine that the additional target point matches the AR anchor associated with the target point based on the 3D coordinates of the additional target point in the 3D AR coordinate system. For example, system 100 may compare the 3D coordinates of the additional target point to the 3D coordinates of one or more AR anchors corresponding to one or more AR scenes that are stored in the AR data storage, and determine that the 3D coordinates of the additional target point match the 3D coordinates of the AR anchor associated with the target point. As described herein, the 3D coordinates of the additional target point and the 3D coordinates of the AR anchors stored in the AR data storage may all be 3D coordinates in the 3D AR coordinate system.

In some embodiments, in response to determining that the 3D coordinates of the additional target point match the 3D coordinates of the AR anchor associated with the target point, system 100 may retrieve the data describing the AR scene associated with the AR anchor from the AR data storage. For example, system 100 may retrieve from the AR data storage the data of the AR scene being stored with the AR anchor, and present the AR scene at the additional target point based on the data. To present the AR scene based on the data, system 100 may obtain a current camera frame that captures the real-world environment in real-time from the perspective of user 210 as user 210 visually focuses on the additional target point, and overlay the virtual elements that are described in the data of the AR scene onto the current camera frame at the additional target point matching the AR anchor. The virtual elements may be positioned relative to the current camera frame such that user 210 may perceive the virtual elements as part of the real-world environment depicted in the current camera frame.

In some embodiments, in addition to determining that the 3D coordinates of the additional target point match the 3D coordinates of the AR anchor associated with the target point, system 100 may also identify one or more feature points in the current camera frame. For example, system 100 may perform one or more image processing operations on the current camera frame to identify one or more feature points describing a portion of the real-world environment proximate to the additional target point (e.g., the portion of the real-world environment may include space within a predefined distance from the additional target point). System 100 may compare the feature points in the current camera frame to the feature map included in the data of the AR scene associated with the AR anchor. As described herein, the feature points in the current camera frame may describe the portion of the real-world environment proximate to the additional target point that matches the AR anchor, while the feature map included in the data of the AR scene may describe the portion of the real-world environment proximate to the target point at which the AR anchor is created. In some embodiments, system 100 may compute a matching score between the feature points in the current camera frame and the feature map included in the data of the AR scene based on the comparison, and determine whether the matching score satisfies a matching score threshold.

In some embodiments, if the matching score satisfies the matching score threshold, system 100 may determine that the portion of the real-world environment proximate to the additional target point that matches the AR anchor is sufficiently similar to the portion of the real-world environment proximate to the target point at which the AR anchor is created. For example, the additional target point may be located on a similar object and/or associated with a similar arrangement of objects as the target point. In this case, system 100 may present the AR scene associated with the AR anchor at the additional target point matching the AR anchor as described above.

On the other hand, if the matching score does not satisfy the matching score threshold, system 100 may determine that the portion of the real-world environment proximate to the additional target point that matches the AR anchor is not sufficiently similar to the portion of the real-world environment proximate to the target point at which the AR anchor is created. For example, the additional target point may be located on a different object and/or associated with a different arrangement of objects than the target point. In this case, system 100 may not present the AR scene associated with the AR anchor at the additional target point due to such context difference even though the additional target point on which user 210 visually focuses matches the AR anchor created at the target point.

In some embodiments, as user 210 visually focuses on an additional target point, user 210 may provide a user input to trigger a presentation of an AR scene associated with an AR anchor that matches the additional target point. The user input may be provided via the user interface (e.g., the touchscreen, the keyboard, the voice command interface, etc.) of AR device 220. Additionally or alternatively, the user input may include an optic action performed by user 210. For example, user 210 may stare at the additional target point for a predetermined time period (e.g., 3 s) and/or perform other types of optic action to request an AR scene associated with an AR anchor that matches the additional target point to be presented, if any. In some embodiments, in response to receiving the user input, system 100 may determine whether an AR anchor that matches the additional target point is stored in the AR data storage in association with an AR scene. If an AR anchor that matches the additional target point is stored in the AR data storage in association with an AR scene, system 100 may retrieve data of the AR scene associated with the AR anchor, and present the AR scene associated with the AR anchor at the additional target point matching the AR anchor based on the data as described herein.

Thus, system 100 may determine the depth value of the target point on which user 210 visually focuses, and determine the 3D coordinates of the target point in the 3D AR coordinate system based at least on the depth value of the target point as described herein. System 100 may also create an AR anchor at the 3D coordinates of the target point in the 3D AR coordinate system, store an AR scene associated with the target point in the AR data storage with the AR anchor, and present the AR scene at the additional target point that matches the AR anchor when user 210 visually focuses at the additional target point a later time. Accordingly, after the AR anchor is created at the target point, user 210 may invoke the presentation of the AR scene associated with the target point and the AR anchor by visually focusing on the additional target point that matches the AR anchor, even if user 210 looks at the additional target point from a distance longer than a detection range threshold of AR device 220.

In some embodiments, system 100 may be implemented in a retail store or a product warehouse to enable user 210 (e.g., a customer, a warehouse worker, etc.) to obtain information of a particular item and/or perform an action associated with the particular item without coming into physical contact with the particular item. For example, one or more AR anchors may be created at one or more positions on the particular item and one or more AR scenes associated with the particular item may be generated and stored in the AR data storage with the one or more AR anchors in the manner described herein. In some embodiments, the AR scenes associated with the particular item may include one or more virtual elements indicating information about the particular item. For example, the virtual elements in the AR scenes may indicate product ID of the particular item, price of the particular item, images capturing the particular item from different perspectives, images of the particular item in different colors, etc. Additionally or alternatively, the AR scenes associated with the particular item may also include one or more virtual elements to perform one or more actions with the particular item. For example, the virtual elements in the AR scenes may include a graphical element to place the particular item in a shopping cart, a graphical element to request item replenishment, etc.

Accordingly, when user 210 visually focuses on a target point matching an AR anchor on the particular item at a distance from the particular item, system 100 may present an AR scene associated with the AR anchor to user 210. Thus, user 210 may obtain information about the particular item from the AR scene and/or interact with the virtual elements included in the AR scene to perform corresponding actions with the particular item without physically touching the particular item. As a result, user 210 may avoid contact with a potentially unhygienic surface of the particular item. This implementation may also facilitate user 210 in comparing various items. For example, user 210 may visually focus on a first target point matching a first AR anchor on a first item, and obtain information of the first item from a first AR scene presented at the first target point matching the first AR anchor. User 210 may then visually focus on a second target point matching a second AR anchor on a second item, and obtain information of the second item from a second AR scene presented at the second target point matching the second AR anchor. Thus, user 210 may compare the information of the first item to the information of the second item by simply focusing on the first target point on the first item and the second target point on the second item. Accordingly, the comparison between the first item and the second item may be performed in a convenient manner and user experience of user 210 may be improved.

In some embodiments, system 100 may be used to identify a bounding box for an object (e.g., a network router). For each edge of the object, user 210 may visually focus on one or more end points of the edge and system 100 may determine a depth value of each endpoint in a manner described herein. The depth value of each endpoint may indicate a distance between the endpoint and an eye (e.g., the left eye or the right eye) of user 210 in the head direction of user 210 as described herein. In some embodiments, system 100 may compute a dimension for each edge of the object based on the depth values of the endpoints associated with the edge, and determine a bounding box that contains the object based on the dimensions associated with the edges of the object. In some embodiments, the bounding box of the object may be used to determine whether the object may fit into a particular space. For example, when troubleshooting a technical issue for a network router of a client remotely, a bounding box of a replacement router may be used to present an AR scene including a virtual replacement router to the client to determine whether the replacement router may fit into a particular space in a real-world environment associated with the client. If the replacement router fits into the particular space in the real-world environment associated with the client, the replacement router may then be sent to the client. Other use case scenarios of system 100 described herein are also possible and contemplated.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
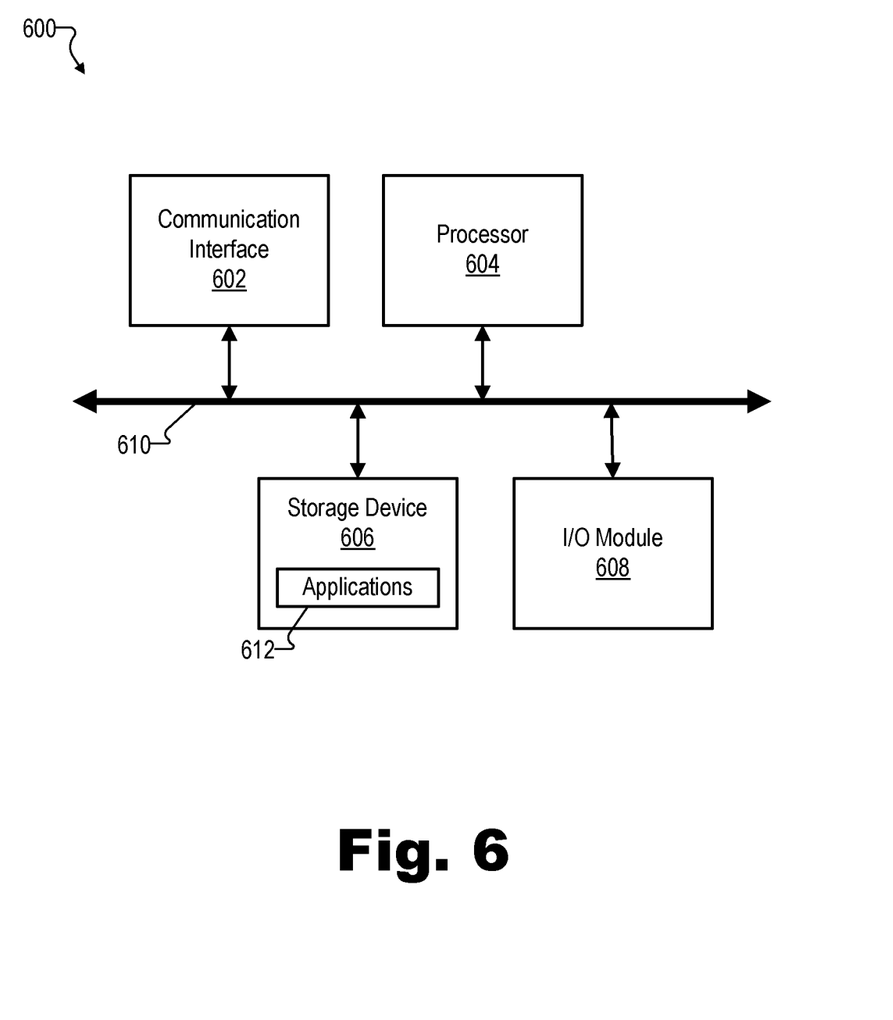
FIG. 6 shows an illustrative computing device according to embodiments described herein.

FIG. 6 shows an illustrative computing device 600 that may be specifically configured to perform one or more of the processes described herein. For example, computing device 600 may include or implement (or partially implement) an AR management system such as system 100, a display device, and/or any other computing devices described herein.

As shown in FIG. 6, computing device 600 may include a communication interface 602, a processor 604, a storage device 606, and an input/output ("I/O") module 608 communicatively connected via a communication infrastructure 610. While an illustrative computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 612 residing within storage device 606 may be configured to direct processor 604 to perform one or more processes or functions associated with processor 104 of system 100. Likewise, memory 102 of system 100 may be implemented by or within storage device 606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by an augmented reality (AR) management system, a first optic parameter of a user corresponding to a first viewed point in a real-world environment and a second optic parameter of the user corresponding to a second viewed point in the real-world environment, the first viewed point and the second viewed point being viewed by the user as the user visually focuses on a target point in the real-world environment, the first optic parameter including left pupil coordinates of the user and right pupil coordinates of the user with which the first viewed point is viewed, the second optic parameter includes left pupil coordinates of the user and right pupil coordinates of the user with which the second viewed point is viewed,
    wherein the determining of the first optic parameter of the user includes:
        receiving one or more camera frames capturing the user and the first viewed point of the user; and
        dynamically determining, based on the one or more camera frames, the left pupil coordinates of the user and the right pupil coordinates of the user with which the first viewed point is viewed;
    determining, by the AR management system, a depth value of the target point based on the first optic parameter and the second optic parameter, the depth value indicating a calculated distance between the target point in the real-world environment and an eye of the user; and
    creating, by the AR management system, an AR anchor associated with the target point based at least on the depth value.

2. The method of claim 1, wherein:
    the first viewed point and the second viewed point are within a proximity of the target point.

3. The method of claim 1, wherein:
    the depth value is included in 3D coordinates of the target point in a 3D real-world coordinate system as a z-coordinate of the target point, the 3D real-world coordinate system being associated with the eye of the user.

4. The method of claim 1, further comprising:
    computing, by the AR management system based on the first optic parameter or based on the second optic parameter, an x-coordinate and a y-coordinate included in 3D coordinates of the target point in a 3D real-world coordinate system associated with an eye of the user.

5. The method of claim 1, wherein the creating of the AR anchor includes:
    translating 3D coordinates of the target point in a 3D real-world coordinate system associated with an eye of the user to 3D coordinates of the target point in a 3D AR coordinate system associated with an AR device of the user; and
    creating the AR anchor at the 3D coordinates of the target point in the 3D AR coordinate system.

6. The method of claim 5, wherein:
the translating is performed using the 3D coordinates of the target point in the 3D real-world coordinate system and a head direction of the user.

7. The method of claim 1, further comprising:
determining, by the AR management system, a head direction of the user based on one or more of a first head angle of the user with which the first viewed point is viewed, a second head angle of the user with which the second viewed point is viewed, or a difference in z-coordinate between the first viewed point and the second viewed point.

8. The method of claim 1, further comprising:
storing, by the AR management system, data describing an AR scene associated with the target point in an AR data storage, the data including a feature map describing the real-world environment, a virtual element associated with the target point, and the AR anchor at which the virtual element is rendered.

9. The method of claim 1, further comprising:
determining, by the AR management system, 3D coordinates of an additional target point on which the user visually focuses at a different time, the 3D coordinates of the additional target point being in a 3D AR coordinate system associated with an AR device of the user;
determining, by the AR management system based on the 3D coordinates of the additional target point, that the additional target point matches the AR anchor;
retrieving, by the AR management system and in response to the determining that the additional target point matches the AR anchor, data describing an AR scene associated with the AR anchor from an AR data storage; and
presenting, by the AR management system, the AR scene at the additional target point based on the data.

10. The method of claim 1, wherein the determining of the left pupil coordinates of the user includes:
determining coordinates of a first eye corner of a left eye of the user in the one or more camera frames;
determining coordinates of a second eye corner of the left eye of the user in the one or more camera frames; and
computing coordinates of a midpoint between the first eye corner of the left eye and the second eye corner of the left eye as the left pupil coordinates of the user.

11. The method of claim 1, wherein:
the AR management system is implemented in an AR device of the user; and
the creating of the AR anchor is performed in response to receiving a user input from the user.

12. The method of claim 11, wherein:
the user input includes an optic action performed by the user.

13. A system comprising:
a memory storing instructions; and
a processor communicatively coupled to the memory and configured to execute the instructions to:
determine a first optic parameter of a user corresponding to a first viewed point in a real-world environment and a second optic parameter of the user corresponding to a second viewed point in the real-world environment, the first viewed point and the second viewed point being viewed by the user as the user visually focuses on a target point in the real-world environment, the first optic parameter including left pupil coordinates of the user and right pupil coordinates of the user with which the first viewed point is viewed, the second optic parameter includes left pupil coordinates of the user and right pupil coordinates of the user with which the second viewed point is viewed,
wherein the determining of the first optic parameter of the user includes:
receiving one or more camera frames capturing the user and the first viewed point of the user; and
dynamically determining, based on the one or more camera frames, the left pupil coordinates of the user and the right pupil coordinates of the user with which the first viewed point is viewed;
determine a depth value of the target point based on the first optic parameter and the second optic parameter, the depth value indicating a calculated distance between the target point in the real-world environment and an eye of the user; and
create an AR anchor associated with the target point based at least on the depth value.

14. The system of claim 13, wherein:
the first viewed point and the second viewed point are within a proximity of the target point.

15. The system of claim 13, wherein:
the depth value is included in 3D coordinates of the target point in a 3D real-world coordinate system as a z-coordinate of the target point, the 3D real-world coordinate system being associated with the eye of the user.

16. The system of claim 13, wherein the creating of the AR anchor includes:
translating 3D coordinates of the target point in a 3D real-world coordinate system associated with an eye of the user to 3D coordinates of the target point in a 3D AR coordinate system associated with an AR device of the user; and
creating the AR anchor at the 3D coordinates of the target point in the 3D AR coordinate system.

17. The system of claim 13, wherein the processor is further configured to execute the instructions to:
store data describing an AR scene associated with the target point in an AR data storage, the data including a feature map describing the real-world environment, a virtual element associated with the target point, and the AR anchor at which the virtual element is rendered.

18. The system of claim 13, wherein the processor is further configured to execute the instructions to:
determine 3D coordinates of an additional target point on which the user visually focuses at a different time, the 3D coordinates of the additional target point being in a 3D AR coordinate system associated with an AR device of the user;
determine, based on the 3D coordinates of the additional target point, that the additional target point matches the AR anchor;
retrieve, in response to the determining that the additional target point matches the AR anchor, data describing an AR scene associated with the AR anchor from an AR data storage; and
present the AR scene at the additional target point based on the data.

19. A non-transitory computer-readable medium storing instructions that, when executed, direct a processor of an augmented reality (AR) management system to:
determine a first optic parameter of a user corresponding to a first viewed point in a real-world environment and a second optic parameter of the user corresponding to a second viewed point in the real-world environment, the first viewed point and the second viewed point being viewed by the user as the user visually focuses on a target point in the real-world environment, the first optic parameter including left pupil coordinates of the user and right pupil coordinates of the user with which the first viewed point is viewed, the second optic parameter includes left pupil coordinates of the user and right pupil coordinates of the user with which the second viewed point is viewed, wherein the determining of the first optic parameter of the user includes:

receiving one or more camera frames capturing the user and the first viewed point of the user; and dynamically determining, based on the one or more camera frames, the left pupil coordinates of the user and the right pupil coordinates of the user with which the first viewed point is viewed;

determine a depth value of the target point based on the first optic parameter and the second optic parameter, the depth value indicating a calculated distance between the target point in the real-world environment and an eye of the user; and create an AR anchor associated with the target point based at least on the depth value.

\* \* \* \* \*